July 26, 1960  J. L. BOWER ET AL  2,946,646
MACHINE TOOL CUTTING TIME INDICATOR
Filed May 20, 1954
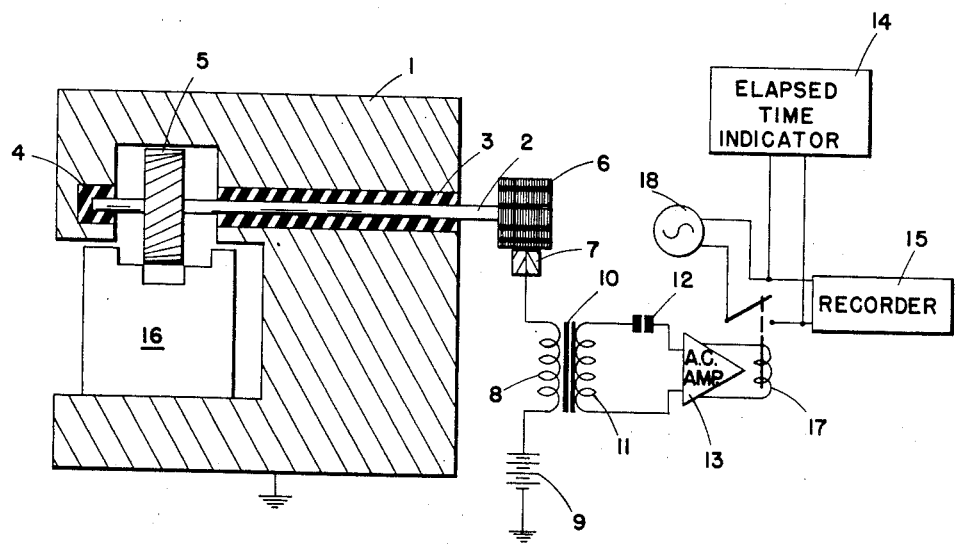
INVENTORS.
JOHN L. BOWER
BY THOMAS E. CURTIS
William R. Lane
ATTORNEY United States Patent Office 2,946,646
Patented July 26, 1960

2,946,646

MACHINE TOOL CUTTING TIME INDICATOR

John L. Bower and Thomas E. Curtis, Downey, Calif., assignors to North American Aviation, Inc.

Filed May 20, 1954, Ser. No. 431,238

7 Claims. (Cl. 346—33)

This invention relates to machine tools for cutting metals and other conductive substances, and particularly to a device for measuring and recording the time during which the cutter of the machine is in actual contact with and cutting a conductive work piece.

In the course of investigation of the durability and longevity of machine tools and the efficiency of personnel operating said tools it becomes important to measure the length of service of the tool and, in particular, the cutting edge; and to record the history of operation of the tool, i.e., the intervals between cuts, the length of time per cut when the machine is actually cutting metal, and the time lost in set-up, insertion, and removal of the work piece. It is of little value to know the time during which the spindle of the machine is rotating alone, or the time during which the cutter is in contact with the work piece. This invention contemplates provision of apparatus and circuitry for the measurement of the time during which the spindle, which carries the cutter or drilling apparatus, is rotating and is also in contact with the workpiece.

It is therefore an object of this invention to provide means for measuring the useful operating time of a machine tool.

It is another object of this invention to provide means for recording the operating history of a machine tool for cutting conductive materials.

It is another object of this invention to provide means for recording the useful operating history of a machine tool and for measuring simultaneously the portion of said history which represents useful work performed by the machine.

It is another object of this invention to provide means conditioned upon the satisfaction of two conditions for the performance of an act.

Other objects of invention will become apparent from the following description taken in connection with the accompanying single figure which is a schematic drawing of the invention.

Referring now to the single figure, there is shown schematically a machine tool frame 1. This machine tool could be a lathe, milling machine, drill cutter, or any other device employing a rotating, cutting, milling, planing, or metal-removing instrument. Frame 1 supports spindle 2 in insulating bearings 3 and 4. In actual practice, the oil film normally present to lubricate the spindle of most machines suffices to provide the necessary insulation, making the insulating sleeve unnecessary. Spindle 2 carries cutter 5 and commutator 6 made up of alternating insulating and conductive strips, the conductive strips being integral with spindle 2. Brush member 7 connects to the primary 8 of transformer 10 and thence to a source of unidirectional current, such as battery 9, the other terminal of which is grounded. Frame 1 is also grounded. Secondary winding 11 of transformer 10 is connected through capacitor 12 to the input of A.-C. amplifier 13, the output of which is fed to relay 17 which in turn controls the operation of elapsed time indicator 14, of any type well-known in the art, and recorder 15, of any type well-known in the art, such as the Streeter-Amet time interval recorder. Relay 17 controls flow of current from A.-C. source 18 to the elapsed time indicator and the recorder as shown.

In operation, current flows from battery 9 through primary winding 8 of transformer 10 and brush 7 to the commutator. If the commutator is rotating, any current flowing is an interrupted D.-C. current. If the commutator is not rotating, indicating that the spindle is at rest, this current flow is direct current. If cutter 5 is in contact with work piece 16 the circuit is completed and current (either A.-C. or D.-C.) flows through the circuit just described, back to ground. If cutter 5 is in contact with work piece 16, and if the commutator and spindle are rotating, a chopped D.-C. current flows and alternating current is induced in secondary winding 11 of transformer 10. This A.-C. signal is amplified by A.-C. amplifier 13 and used to drive elapsed time indicator 14 and recorder 15 which perform two functions. The elapsed time indicator indicates a cumulative total of time elapsed during which A.-C. amplifier 13 had an output. Recorder 15, on the other hand, produces a record in printed form, or any other convenient form, of not only the intervals when A.-C. amplifier 13 has an output, but also of the intervals when it has no output. Recorder 15 and elapsed time indicator 14 are normally driven by a mechanical clock which forms an integral part thereof and which is not shown separately in the drawing. A complete history of the outputs of A.-C. amplifier 13 is thus provided. A.-C. amplifier 13, however, has an output only when it has an A.-C. input, and this A.-C. input exists only when cutter 5 is in contact with the workpiece and spindle 2 is rotating to permit chopping of the D.-C. current supplied by battery 9. Thus, it can be seen that if the spindle is at rest, only D.-C. is presented to transformer 10 even though the cutter is in contact with the work piece. Hence, the amplifier has no output. Also, when the spindle is turning and the cutter is not in contact with the work piece, no current flows and, again, the amplifier has no input.

Thus, in the broadest aspect of this invention it can be seen that relay 17 closes only when two conditions are met: (1) the cutter makes electrical contact with the work piece, and (2) the spindle is rotating to periodically interrupt current flow.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for measuring the useful running time of a machine having a rotating metal-removing tool comprising commutating means rotatable with said tool; a circuit including said tool, said commutating means, a source of direct current, and the work piece machined by said machine; said circuit being conductively completed when said tool is in contact with said workpiece; an elapsed time meter; and means responsive to commutated current in said circuit for operating said elapsed time meter.

2. Means for producing an alternating current signal during the working time of a metal cutting machine having a rotating cutter on a metallic spindle oil-insulated from the frame of said machine, comprising a commutator mounted on said spindle and having conductive portions thereof in electrical contact with said spindle, means for providing a direct current path through said commutator and the work piece contacted by said cutter, and a transformer having its primary winding in circuit with said direct current supplying means and said commutator in said direct current path whereby the secondary winding of said transformer produces alternating current only when said cutter is rotating and in contact with said work piece.

3. A device as recited in claim 2 and further comprising an elapsed time meter responsive to the output of said transformer.

4. A device as recited in claim 2 and further comprising a recorder responsive to said transformer's output.

5. Means for producing an alternating current signal during the working time of a metal cutting machine having a rotating cutter on a metallic spindle oil-insulated from the frame of said machine, comprising a commutator mounted on said spindle and having conductive portions thereof in electrical contact with said spindle, a workpiece contacted by said cutter, means for supplying direct current to said commutator and said work piece contacted by said cutter, and means in circuit with said direct current supplying means and said commutator for producing an alternating current when said cutter is rotating and said cutter is in contact with said work piece.

6. A device as recited in claim 5 and further comprising an elapsed time meter responsive to said alternating current means.

7. Means for producing a signal indicative of the working time of a metal cutting machine comprising a spindle electrically insulated from the frame of said machine, a rotating cutter mounted on said spindle for cutting a metal work piece, a commutator having a plurality of conducting and insulating segments alternately disposed on said commutator, said conducting segments in contact with said spindle, brush means for making successive contact with said segments, a transformer having its primary winding connected to said brush means, a D.-C. source connected to provide a current path through said primary winding, said brush means, said conducting segments, said spindle, said rotating cutter, and said work piece, the current through said current path being direct when said cutter is in contact with said work piece and not rotating, and being alternating when said cutter is in contact with said work piece and rotating whereby a current is produced in the secondary winding of said transformer when the current through said current path is alternating, means responsive to said secondary winding for measuring the elapsed time of work of said metal cutting machine, and means responsive to said secondary winding for measuring the work time and the non-work time of said metal cutting machine.

References Cited in the file of this patent

UNITED STATES PATENTS

| | | |
|---|---|---|
| 1,989,233 | Hutchinson | Jan. 29, 1935 |
| 2,038,187 | McNeil | Apr. 21, 1936 |
| 2,306,372 | Banks | Dec. 29, 1942 |
| 2,321,992 | Canetta et al. | June 15, 1943 |
| 2,338,599 | Ridgway | Jan. 4, 1944 |
| 2,340,114 | Duis | Jan. 25, 1944 |
| 2,677,093 | Maltby | Apr. 27, 1954 |